United States Patent [19]

Jansen et al.

[11] Patent Number: 5,470,523
[45] Date of Patent: Nov. 28, 1995

[54] PROCESS OF MOLDING PRODUCTS BY RIM

[75] Inventors: Bernhard Jansen, Cologne; Jürgen Grönen, Overath; Hanns P. Müller, Odenthal-Hoeffe, all of Germany

[73] Assignee: Bayer Aktiengesellschaft, Leverkusen, Germany

[21] Appl. No.: 304,058

[22] Filed: Sep. 12, 1994

Related U.S. Application Data

[63] Continuation of Ser. No. 58,069, May 4, 1993, abandoned.

[30] Foreign Application Priority Data

May 14, 1992 [DE] Germany .................. 42 15 875.3

[51] Int. Cl.$^6$ ............................................. B29C 45/00
[52] U.S. Cl. ................................. 264/328.6; 264/328.17
[58] Field of Search .................. 264/328.6, 328.17, 264/328.18

[56] References Cited

U.S. PATENT DOCUMENTS

| | | | |
|---|---|---|---|
| 3,406,140 | 10/1968 | Polestak et al. | 524/114 |
| 4,737,564 | 4/1988 | Goel | 528/54 |
| 4,788,224 | 11/1988 | Müller et al. | 521/104 |
| 5,021,536 | 6/1991 | Müller et al. | 528/73 |
| 5,173,559 | 12/1992 | Müller et al. | 528/44 |

OTHER PUBLICATIONS

Becker, W. E. *Reaction Injection Molding*. New York, Van Nostrand Reinhold Co., 1979. Pp. 5, 59–92.

*Primary Examiner*—Leo B. Tentoni
*Attorney, Agent, or Firm*—Joseph C. Gil; N. Denise Brown

[57] ABSTRACT

The present invention relates to the use of organic compounds which contain epoxide groups and which are subjected to a heat treatment at 30° to 150° C. in the presence of an alkylating agent, as auxiliary substances to increase the weather resistance of molded plastic parts. These molded parts are produced by the reaction injection molding technique and the process comprises reacting reaction mixtures based on polyioscyanate addition products.

5 Claims, No Drawings

5,470,523

PROCESS OF MOLDING PRODUCTS BY RIM

This application is a continuation of application Ser. No. 08/058,069, filed May 4, 1993, (now abandoned).

BACKGROUND OF THE INVENTION

The present invention relates to the use of compounds which contain epoxide groups and which are subjected to a heat treatment in the presence of alkylating agents as the auxiliary substances used to improve the weather resistance in the production of molded parts based on polyisocyanate polyaddition products by the reaction injection molding process ("RIM process").

The weather resistance of RIM molded parts, which are generally produced with the use of aromatic polyisocyanates, leaves much to be desired, so that their use outdoors, such as e.g. the molding material which surrounds the window panes for car windows, is not possible, although all desired mechanical properties can be provided. It is possible to lacquer the finished pane module to guarantee light protection, but this represents an additional manufacturing stage which is also very expensive.

The conventional protective agents for light and ageing represent a further possibility for the weather resistance of RIM molded bodies based on aromatic polyisocyanates. These reduce decomposition reactions by means of their chemical structure by acting as radical traps. However, these protective substances are consumed as a result of their chemical action, and a breakdown of the weather resistance is observed as soon as the auxiliary substances used are exhausted.

RIM molded parts produced from aliphatic polyisocyanates are, as a rule, considerably more weather resistant and require no additional stabilization. However, the high price of these aliphatic polyisocyanates makes their use in the large-scale production of RIM molded parts uneconomical.

It has recently been found that compounds which contain organic epoxide groups and which are subjected to heat treatment in the presence of an alkylating agent are extremely effective auxiliary substances for increasing the weather resistance of RIM molded parts based on polyisocyanate polyaddition products, particularly those based on polyurethanes which optionally contain urea groups.

Reaction mixtures based on organic polyisocyanates, and compounds which contain epoxide groups and substances with alkylating action are known for example from EP A 272,563, EP A 331,996 or EP A 368,031. In particular, according to EP A 368,031, heat treatment of the epoxide component in the presence of an alkylating agent is considered. These reactive systems of the prior publications mentioned are, however, not used for the production of molded parts by the reaction injection molding technique. In addition, there is no indication of a stabilizing action of compounds which contain epoxide groups and which are subjected to a heat treatment in the presence of alkylating agents for the purposes of the present application, as described in more detail hereinafter.

DESCRIPTION OF THE INVENTION

The present invention is directed to a process for the production of molded plastic parts by a reaction injection molding technique comprising reacting in a mold, a reaction mixture of a) a polyisocyanate and b) a polyfunctional isocyanate-reactive component, wherein the reaction mixture also contains an auxiliary substance comprising one or more organic compounds which contain epoxide groups and which are subjected to heat treatment at 30° to 150° C. in the presence of an alkylating agent. These auxiliary substances increase the weather resistance of the molded plastic parts produced by the reaction injection molding technique comprising reacting reaction mixtures based on polyisocyanate polyaddition products.

These auxiliary substances essential for the present invention are used as additives in reactive systems in a way known per se for the production of molded parts by the reaction injection molding technique comprising reacting a mixture based on polyisocyanate polyaddition products, and particularly a mixture based on polyurethanes which optionally contain urea groups. This means that the auxiliary substances essential for the invention can be used, for example, equally well as additives in the process according to U.S. Pat. No. 4,065,410, as, for example, in the process according to U.S. Pat. No. 4,218,543, or in the process according to U.S. Pat. No. 4,774,263 or EP B 81,701.

These processes have in common an operation according to the "one-shot principle", wherein the polyisocyanate component is reacted with the "isocyanate-reactive component" in one step, according to the principle of the reaction injection molding technique in closed molds. The "isocyanate-reactive component" generally consists of a mixture of (i) higher-molecular weight polyether polyols or aminopolyethers, for example, in the molecular weight range of from 1800 to 12,000, with (ii) low-molecular weight polyhydric alcohols and/or polyamines, preferably sterically hindered aromatic diamines (U.S. Pat. No. 4,218,543), as well as (iii) the usual auxiliary substances and additives. Aromatic polyisocyanates are typically used as the polyisocyanate component in this process. In particular, it is preferred that polyisocyanates of the diphenylmethane series, which are liquid at room temperature, and which are optionally modified by urethane and/or carbodiimide or uretonimine, or mixtures thereof, are used as the polyisocyanate component The process according to the present invention is not restricted to these processes of the prior art. It is also suitable, for example, for the modification of the procedure as disclosed by German Patentschrift 3,827,595, German Offenlegungsschrift 3,914,718, German Offenlegungsschrift 4,115,037, U.S. Pat. No. 4,297,444 or U.S. Pat. No. 4,374,210.

These prior publications disclose a two-step operating procedure, wherein an NCO-semiprepolymer is produced in a preliminary reaction from the polyisocyanate component and at least a part of the higher-molecular weight polyol component (i); the NCO-semiprepolymer is then reacted with a mixture of chain extending or crosslinking agents (ii) (i.e. the low-molecular weight polyhydric alcohols and/or polyamines), the usual auxiliary agents and additives (iii), and, optionally, any remaining fractions of the higher-molecular weight polyol component (i), by the reaction injection molding technique in closed molds.

The additives essential for the invention are organic compounds which contain epoxide groups and which are subjected to a heat treatment in the presence of alkylating agents.

The epoxide component is at least one organic epoxide, and preferably at least one organic compound which contains from 1 to 4 epoxide groups per molecule, and more preferably from 1 to 2 epoxide groups per molecule, at an epoxy equivalent weight of from 70 to 500, and preferably 170 to 220. Suitable compounds include monoepoxides, such as, for example, phenoxypropylene oxide, styrene oxide or glycidyl alcohol; or higher-functional polyepoxides such as, for example, polyglycidyl ethers of polyhydric phenols, and in particular, of bisphenol A, but also, e.g., of bisphenols of the general formula:

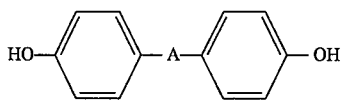

wherein A represents —SO$_2$—, —CO—, —O—, —S—, —CH$_2$—,

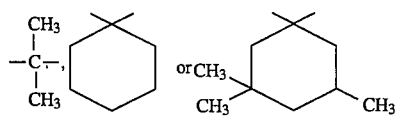

polyepoxide compounds based on aromatic amines, in particular bis(N-epoxypropyl)aniline, N, N'-dimethyl-N,N'-diepoxypropyl -4,4,'-diaminodiphenylmethane and N-diepoxypropyl-4-aminophenylglycidyl ether; polyglycidyl esters of cycloaliphatic dicarboxylic acids, in particular hexahydrophthalic acid diglycidyl ester, and polyepoxides from the reaction products of n moles of hexahydrophthalic anhydride and 1 mole of a polyol containing n hydroxyl groups (wherein n=an integer from 2 to 6), and in particular of 3 moles of hexahydrophthalic anhydride and one mole of 1,1,1-trimethylolpropane, Suitable alkylating agents include, for example, methyl iodide, dimethyl sulfate, or, preferably, sulfonic acid alkyl esters having a molecular weight of from 110 to 250 and having 1 to 4 carbon atoms in the alkyl group. These include both aliphatic sulfonic acid alkyl esters such as, for example, methanesulfonic acid methyl ester, n-butanesulfonic acid methyl ester, n-perfluorobutanesulfonic acid methyl ester, n-hexane-sulfonic acid ethyl ester; and aromatic sulfonic acid alkyl esters such as benzenesulfonic acid methyl ester, ethyl ester or n-butyl ester, p-toluenesulfonic acid methyl ester, ethyl ester or n-butyl ester, 1-naphthalenesulfonic acid methyl ester, 3-nitrobenzenesulfonic acid methyl ester or 2-naphthalenesulfonic acid methyl ester. The sulfonic acid esters mentioned by way of example are preferred. It is particularly preferred to use p-toluenesulfonic acid methyl ester as an alkylating agent.

In general, the alkylating agents are used in an amount of from 0.005 to 1 wt %, and preferably of from 0.05 to 0.25 wt %, relative to the weight of the epoxide component. Before the heat treatment, a mixture of the epoxide component and the alkylating agent is produced. It is possible for this mixture to additionally contain at least a part of the polyisocyanate component which is used for the production of the molded part. However, only the simultaneous presence of the epoxide component and the alkylating agent in the indicated quantity ratio are essential during the heat treatment. In general, the heat treatment itself consists of heating the mixture for a period of from 5 minutes to 2.5 hours, and preferably of from 15 to 60 minutes, at temperatures ranging from 30° to 150° C., and preferably from 80° to 130° C.

In the process according to the present invention, it is preferred that the compounds which contain epoxide groups and which are subjected to the heat treatment mentioned are used in a mixture with the polyisocyanate component. It is most preferred that this mixture consists of a (i) at least a part of the polyisocyanate component, (ii) the epoxide component and (iii) the alkylating agent, which thereby directly results in a polyisocyanate component which contains the stabilizer essential for the invention. A separate heat treatment and a mixing of the so pretreated auxiliary substance with the polyisocyanate component or with the "polyol component" is also basically possible. However, the polyol component is to a great extent inert towards compounds having epoxide groups. The auxiliary substances essential for the invention are preferably used in a mixture with the polyisocyanate component, or in a mixture with the NCO-semiprepolymers in the above mentioned semi-prepolymer process. In all variations of the process according to the invention, the auxiliary substances essential for the invention are used in amounts such that the proportion by weight of the epoxide component to be subjected to the heat treatment is 2.5 to 40 wt %, and preferably 5 to 30 wt %, relative to the total weight of the reaction mixture used in the production of the molded parts.

An optimization of the stabilizing action of the auxiliary substances essential for the invention is achieved in the production of the molded parts by the substitution of up to 15 wt %, and preferably from 1 to 10 wt %, of (cyclo)aliphatic polyisocyanates, relative to the total weight of the polyisocyanates, instead of the usual aromatic polyisocyanates, and in particular, instead of the polyisocyanates of the diphenylmethane series, which are liquid at room temperature, or mixtures thereof, previously mentioned. (Cyclo)aliphatic polyisocyanates suitable for the production of these mixtures include, for example, hexamethylene diisocyanate, 1,12-dodecane diisocyanate, cyclobutane-1,3-diisocyanate, cyclohexane -1,3- and -1,4-diisocyanate as well as any mixtures of these isomers, 1-isocyanato-3,3-5-trimethyl-5-isocyanatomethylcyclohexane, perhydro-2,4'- and/or -4,4'-diphenylmethanediisocyanate, or modification products of the above-mentioned aliphatic polyisocyanates with e.g. isocyanurate, carbodiimide, allophanate, biuret or uretdione structural units, as can be produced according to processes of the prior art known per se from the simple diisocyanates mentioned by way of example.

Particularly preferred polyisocyanates of an aliphatic nature according to the present invention are the technical isocyanates usual in polyurethane chemistry, such as, for example, hexamethylene diisocyanate, 1-isocyanato-3,3,5-trimethyl- 5-isocyanatomethyl-cyclohexane (isophoronediisocyanate or IPDI for short), 4,4'-diisocyanatodicyclohexylmethane and the modification products of these technical polyisocyanates which contain biuret or isocyanurate groups.

Starting components of the kind known per se, such as those mentioned by way of example in the above cited prior publications, can be used for the auxiliary substances essential for the production of weather-resistant molded parts, The polyisocyanate component preferably consists of aromatic polyisocyanates, and, in particular, polyisocyanates of the diphenylmethane series, which are liquid at room temperature, or mixtures thereof, of the kind disclosed herein, or of mixtures of such polyisocyanates with (cyclo)aliphatic polyisocyanates of the last-mentioned kind.

The higher-molecular weight component which contains groups reactive towards isocyanate groups are preferably polyether polyols, known per se, in the molecular weight range of from 400 to 12,000, and preferably of from 1800 to 12,000, which contain predominantly (i.e. at least 80%) primary hydroxyl groups and have a hydroxyl functionality of 2 to 3.

The chain extender or cross-linker components are preferably simple lower-molecular weight alcohols in the molecular weight range of from 62 to 400, such as, for example, ethylene glycol, propylene glycol, 1,4-butanediol, glycerol, trimethylolpropane, or mixtures of such polyhydric alcohols. It is particularly preferred to use aromatic diamines which contain sterically hindered amino groups of the kind mentioned in U.S. Pat. No. 4,218,543. A very particularly preferred chain extending agent is 1-methyl-3,5-diethyl-2,4-diaminobenzene or its technical mixtures with 1-methyl-3,5-diethyl-2,6-diaminobenzene (i.e. DETDA).

According to the process of the invention, the other usual auxiliary agents and additives can be utilized concomitantly. Suitable auxiliary substances and additives include, for example, fillers, especially fillers with reinforcing action, such as silicate minerals, for example, layer silicates such as antigorite, serpentine and wollastonite, and, in particular, glass fibers of various lengths, that optionally can be sized; pigments such as, for example, titanium dioxide or iron oxide pigments; catalysts such as, for example, tertiary amines such as triethylamine, triethylenediamine, N,N-dimethylbenzylamine, tin catalysts such as, for example, dibutyltin dilaurate; or internal mold release agents as described for example in U.S. Pat. No. 3,726,952, Great Britain Offenlegungsschrift 1,356,215, German Offenlegungsschrift 2,356,692, German Offenlegungsschrift 2,363,452, German Offenlegungsschrift 2,404,310, German Offenlegungsschrift 2,427,273, German Offenlegungsschrift 2,431,968 or Great Britain Patentsschrift 1,420,293. Also zinc salts, in particular, zinc stearate, can be used concomitantly as an internal mold release agent in combination with suitable compatibilizers (cf. regarding this for example EP A 255,905, EP,B 173,888, EP B 190,317 or EP A 119,471).

In the process according to the invention, the reactants named by way of example are mixed together in the usual amounts for the reaction injection molding process and charged to a closed mold. Possible mold materials include the usual materials, and, in particular, metal or plastic materials.

The amount of the reaction mixture charged to the mold is generally calculated so that molded parts produced have a density of from 0.8 to 1.4 g/cm$^3$, and preferably of from 1.0 to 1.3 g/cm$^3$. Molded parts having a density exceeding 1.2 g/cm$^3$ are generally obtained when fillers of the kind mentioned above, by way of example, which have a high density, are concomitantly used. Molded parts having a density below 1.0 g/cm$^3$ are generally obtained when the mold is partially filled with the reaction mixture and, simultaneously, a blowing agent of the kind known per se is concomitantly used.

The molded parts are produced using such quantities of the reactants as to correspond to an NCO index of 90 to 250, and preferably of 100 to 200. The "NCO index" (i.e. isocyanate index) is calculated according to the following formula:

$$\text{NCO index} = \frac{\text{actual amount of isocyanate}}{\text{calculated amount of isocyanate}} \times 100$$

According to the process of the invention, flexible and compact molded parts are produced which are characterized by good weather resistance and outstanding mechanical values.

These molded parts can be used for the production of bodywork parts of vehicles, and particularly window profiles. They are also suitable for use as furniture parts, technical devices, and structural units.

The invention is further illustrated but is not intended to be limited by the following examples in which all parts and percentages are by weight unless otherwise specified. In the following examples, all percentages relate to weight.

EXAMPLES

Polyol component 1

A polyol mixture having an OH number of 104 and a viscosity at 20° C. of 1400 mPa.s, consisting of 82.0 pts. wt. of a polyether having an OH number of 28, and which is produced by the propoxylation of trimethylolpropane and subsequent ethoxylation of the propoxylation product (PO:EO weight ratio=78:22); 3.8 pts. wt. of a suspension consisting of 10% carbon black and 90% of a polyether polyol having an OH number of 35, which is produced by the propoxylation of trimethylolpropane and subsequent ethoxylation of the propoxylation product (PO:EO weight ratio=86.5:13.5); 10.1 pts. wt. DETDA (mixture of 65% 1-methyl-3,5-diethyl-2,4-diaminobenzene and 35% 1-methyl-3,5-diethyl-2,6-diaminobenzene); 3.9 pts. wt. bis(2,2',6,6'-tetramethyl-4-piperidyl) sebacate as an UV protective agent; 0.1 pts. wt. triethylenediamine (33% solution in dipropylene glycol); and 0.1 pts. wt. dibutyltin dilaurate.

Polyol component 2

A polyol mixture having an OH number of 108 and a viscosity at 20° C. of 1700 mPa.s, consisting of 79.8 pts. wt. of the aforesaid polyether polyol having an OH number of 28 (from polyol component 1); 3.7 pts. wt. of the aforesaid carbon black suspension (i.e. from polyol component 1); 12.6 pts. wt. of DETDA of the aforesaid composition (from polyol component 1); 3.7 pts. wt. bis(2,2',6,6'-tetramethyl-4-piperidyl) sebacate as an UV protective agent; 0.1 pts. wt. triethylenediamine (33% solution in dipropylene glycol); and 0.1 pts. wt. dibutyltin dilaurate.

Polyol component 3

A polyol mixture having an OH number of 127 and a viscosity at 20° C. of 1700 mPa.s, consisting of 82.5 pts. wt. of the aforesaid polyether polyol of OH number 28 (from polyol component 1); 6.0 pts. wt. ethylene glycol; 4.0 pts. wt. of the aforesaid carbon black suspension (from polyol component 1); 4.0 pts. wt. of a commercially available UV stabilizer (Tinuvin 765, manufacturer: CIBA-GEIGY AG); 1.5 pts. wt. of a commercially available UV stabilizer (Tinuvin P, manufacturer: CIBA-GEIGY AG); 1.5 pts. wt. of a commercially available UV stabilizer (Irganox 1010, manufacturer: CIBA-GEIGY AG); 0.3 pts. wt. of a 33% solution of triethylenediamine in dipropylene glycol; and 0.2 pts. wt. dibutyltin dilaurate.

Polyisocyanate 1 (comparative)

The reaction product of 4,4'-diisocyanatodiphenylmethane with tripropylene glycol, with NCO content of 23%.

Polyisocyanate 2 (according to the invention)

96 pts. wt. polyisocyanate 1, 24 pts. wt. of the bisglycidyl ether of bisphenol A; and 0.15 pts. wt. p-toluenesulfonic acid methyl ester are charged together and heated at 120° C. with stirring for 1 hour. After cooling, the isocyanate content is 17.4%.

Polyisocyanate 3 (according to the invention)

108 pts. wt. polyisocyanate 1; 12 pts. wt. of the bisglycidyl ether of bisphenol A; and 0.15 pts. wt. p-toluenesulfonic acid methyl ester are charged together and heated at 120° C. with stirring for 1 hour.

After cooling, the isocyanate content is 19.8%.

Production of the molded parts

Using the aforementioned polyol components and polyisocyanates, molded parts are produced by the reaction injection molding technique. The reactants are thoroughly mixed by the use of a Rimdomat machine and a mold having dimensions of 3×200×500 mm is used, wherein the internal walls were pretreated with a soap-based external mold release agent. The quantity of the reactants used corresponds to an NCO index of 118. The mold was completely filled with the reaction mixture, so that molded parts of density 1.0 g/cm$^3$ resulted. Prior to the reactants being thoroughly mixed, they were heated to 40° to 45° C. (polyol) or 30° to 35° C. (polyisocyanate). The mold internal temperature prior to filling was about 65° C. The mold time was 30 seconds.

The recipes for the production of the molded parts are shown in the following Table (i.e. Table 1):

TABLE #1

| Experiment | Isocyan- | Polyol | NCO Index | Comments |
| --- | --- | --- | --- | --- |
| 1 | 1 | 1 | 118 | comparative example |
| 2 | 2 | 1 | | examples |
| 3 | 3 | 1 | | according to the invention |
| 4 | 1 | 2 | 118 | comparative example |
| 5 | 2 | 2 | | examples |
| 6 | 3 | 2 | | according to the invention |
| 7 | 1 | 3 | 118 | comparative example |
| 8 | 2 | 3 | | examples |
| 9 | 3 | 3 | | according to the invention |

Evaluation of the experiments (weatherometer test)

A comparison of the molded parts produced according to the invention (i.e. Examples 2, 3, 5, 6, 8, and 9) with the molded parts produced according to the prior art (i.e. examples 1, 4, and 7), a weatherometer test was carried out. The Gardner gloss was determined as a measurable variable for the changes in the molded parts due to the effect of weathering. The Gardner gloss is shown below in Table 2 as a function of the time of weathering in the weatherometer.

TABLE 2

| | Gardner gloss (%) after weathering time (h)* | | | | | | | | |
| --- | --- | --- | --- | --- | --- | --- | --- | --- | --- |
| Experiment | 0 | 50 | 1000 | 1500 | 2000 | 2500 | 3000 | 3500 | 4000 |
| 1 | 60 | 78 | 71 | 26 | — | — | — | — | — |
| 2 | 60 | 67 | 72 | 72 | 71 | 77 | 34 | 3 | — |
| 3 | 28 | 37 | 46 | 48.5 | 49 | 22 | 3 | — | — |
| 4 | 59 | 75 | 75 | 5 | — | — | — | — | — |
| 5 | 55 | 67 | 69 | 73 | 71 | 19 | — | — | — |
| 6 | 52 | 61 | 64 | 66 | 50 | — | — | — | — |
| 7 | 64 | 62 | 67 | 69 | 38 | — | — | — | — |
| 8 | 49 | 57 | 64 | 67 | 68 | 66 | 64 | 43 | 4 |
| 9 | 55 | 62 | 66 | 68 | 66 | 62 | 39 | 2 | 0 |

*The weathering was carried out with the cycle 17 minutes dry, 3 minutes rain.

What is claimed is:

1. In a process for the production of molded plastic parts by a reaction injection molding technique comprising reacting a reaction mixture of a) a polyisocyanate and b) a polyfunctional isocyanate-reactive component comprising i) polyether polyols or aminopolyethers having molecular weights of from 1800 to 12,000, ii) low molecular weight compounds selected from the group consisting of polyhydric alcohols, polyamines, and mixtures thereof, and iii) auxiliary substances and additives, in a mold, allowing the mixture to react, and removing the part from the mold, the improvement wherein said reaction mixture contains a substance comprising one or more organic compounds which contain epoxide groups and which are subjected to heat treatment at 30° to 150° C. in the presence of an alkylating agent.

2. The process of claim 1 wherein said molded plastic parts have densities of from 0.8 to 1.4 g/cm$^3$.

3. the process of claim 1 wherein component b) ii) comprises a sterically hindered aromatic diamine.

4. The process of claim 1 wherein said organic compounds which contain epoxide groups and which are subjected to heat treatment in the presence of alkylating agents are mixed with said polyisocyanate component.

5. The process of claim 4, wherein said mixture of said polyisocyanate and said organic compounds which contain epoxide groups and which are subjected to heat treatment in the presence of an alkylating agent is produced in situ such that a mixture of (i) at least a part of said polyisocyanate component, with (ii) at least one of said organic compounds which contain epoxide groups are subjected to heat treatment at 50° to 150° C. in the presence of an alkylating agent.

* * * * *